(12) United States Patent
Loce et al.

(10) Patent No.: US 8,184,340 B2
(45) Date of Patent: May 22, 2012

(54) METHOD FOR COLOR RENDERING USING SCANNED HALFTONE CLASSIFICATION

(75) Inventors: Robert P. Loce, Webster, NY (US); Martin S. Maltz, Rochester, NY (US); Jay S. Grzenda, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 2521 days.

(21) Appl. No.: 10/462,966

(22) Filed: Jun. 17, 2003

(65) Prior Publication Data

US 2004/0257619 A1 Dec. 23, 2004

(51) Int. Cl.
*H04N 1/52* (2006.01)
*G06T 7/00* (2006.01)

(52) U.S. Cl. .......... 358/2.1; 358/1.9; 358/534; 358/518; 358/3.23; 358/3.07; 382/162; 382/173; 382/224

(58) Field of Classification Search .............. 358/2.1, 358/534, 1.9, 518, 3.23, 3.07; 382/162, 173, 382/224
See application file for complete search history.

(56) References Cited

U.S. PATENT DOCUMENTS

| | | | |
|---|---|---|---|
| 5,173,788 A | 12/1992 | Ohta | |
| 5,293,430 A | 3/1994 | Shiau et al. | |
| 5,339,172 A | 8/1994 | Robinson | |
| 6,075,614 A * | 6/2000 | Ohtsuka et al. | 358/1.1 |
| 6,078,697 A | 6/2000 | Ng | |
| 6,128,408 A | 10/2000 | Clark | |
| 6,185,328 B1 * | 2/2001 | Shiau | 382/173 |
| 6,400,844 B1 * | 6/2002 | Fan et al. | 382/173 |
| 6,683,702 B1 | 1/2004 | Loce et al. | |
| 7,079,289 B2 | 7/2006 | Loce et al. | |
| 7,133,161 B2 | 11/2006 | Xu et al. | |
| 2004/0170338 A1 * | 9/2004 | Maurer | 382/260 |

FOREIGN PATENT DOCUMENTS

EP 1067765 6/2000

OTHER PUBLICATIONS

Pending U.S. Appl. No. 09/348,398, filed Jul. 7, 1999, entitled "Compact-Dot Reproduction of Scanned Halftone Screens", by Robert P. Loce et al.

Pending U.S. Appl. No. 09/968,651, filed Oct. 1, 2001, entitled "Rank-Order Error Diffusion Image Processing", by Robert P. Loce, et al. U.S. Publication No. 20030090729.

Pending U.S. Appl. No. 10/153,355, filed 05/55/02, entitled "Rehalftoning of Gray Halftones With Optimal Screen Frequency for Robust Suppression of Moiré", by Beilei Xu et al.

An unofficial Prosecution History, as of Oct. 5, 2010 for European Patent Application EP 04253548.4 which corresponds to U.S. Appl. No. 10/462,966.

An unofficial File History as of Oct. 6, 2010 for US Patent 7079289.
An unofficial File History as of Oct. 6, 2010 for US Patent 7133161.
An unofficial File History as of Oct. 7, 2010 for US Patent 6683702.
Miceli, C.;Parker, K.; Inverse Halftoning; Journal of Electronic Imaging/Apr. 1992/ vol. 1(2) pp. 143-151-145.
Schweizer, S.; Stevenson, R; A Bayesian Approach to Inverse Halftoning; SPIE vol. 1913; pp. 282-291.

* cited by examiner

*Primary Examiner* — Sudhanshu C Pathak
*Assistant Examiner* — Quang N Vo

(57) ABSTRACT

What is disclosed is an image path that advantageously uses halftone classification to select appropriate mappings in gray-scale management and color management operations. The tags generated in the scanner help identify different classes of halftones. One is selected from several pixel-value mappings to provide proper compensation. That is, the one-dimensional and multi-dimensional pixel-value mappings within the color management module are selected based on halftone classification tags from the scanner. The tagging is either one bit that indicates "Low Frequency Halftone" and "Not LFHT", or, more preferably, the tag is multi-bit indicating a frequency bin that contains the frequency of the input halftone. Additionally, the multi-bit tag can indicate particular halftone screen types, such as dot screens, line screens, stochastic screens or error diffusion. The pixel value mappings are typically implemented as Look-Up Tables (LUTs), and the LUTs of the present invention are optimized for the various halftone classes. Generation of the LUTs, or other pixel-value mappings, is non-trivial in that such mappings are normally applied to contone images and not to blurred halftoned images. The pixel-value mappings of the present invention are derived via an iterative process. Alternatively, a model for this modulated image type is used.

39 Claims, No Drawings

METHOD FOR COLOR RENDERING USING SCANNED HALFTONE CLASSIFICATION

FIELD OF THE INVENTION

The present invention generally relates to the field of imaging architecture for reproducing documents and, more particularly, to methods for rendering scanned halftone images using halftone classifications.

BACKGROUND OF THE INVENTION

Color imaging is an everyday experience for people with normal vision. In our modern world, we are constantly exposed to color images produced by televisions, computer monitors, magazines, books, and posters, just to name a few. Color imaging affects every aspect of our lives from physical appearance (e.g. clothing) to psychological sensation (e.g. painting and art forms). As an integral part of daily human experiences, color imaging has evolved into valuable commercial endeavors. For example, textile, printing, and display industries are businesses that generate enormous economic powers.

In the reproduction or display of images from image data representing an original or scanned document one is faced with the limited resolution capabilities of the rendering system and the fact that many output devices are binary or require compression to binary for storage efficiency. Further complicating the reproduction or display of images is the reality that image output terminals must be able to process a variety of different image types including grayscale or continuous tones (contone), halftones of various frequencies, text/line art, etc. as well as image data comprising any combination of the above. Moreover, while an image processing system may be tailored so as to offset the limited resolution capabilities of the rendering apparatus, this tailoring is difficult due to the divergent processing needs required by different image types.

Digital halftoning, often called spatial dithering, is the process of creating the illusion of continuous tone images from the judicious arrangement of binary picture elements. Digital halftoning is a major technology for the printing industry and the display industry. For the past three decades or so, active research and development activities have focused on color digital halftoning, ranging from theoretical understanding and model development to practical design. A good coherent and systematic view of digital color halftoning is: "*Digital Color Halftoning*", Henry Kang, November 1999, ISBN: 0-8194-3318-7, but is primarily aimed at technical professionals in the field of digital color imaging that want to understand the halftone process and be able to design halftone screens and screen-less processes for research and development purposes.

Optimizing a system for one common image type typically comes at the expense of degraded rendering of other image types. Consider, for example, printing a document having both contone pictorial data and text/line art on a binary printing system such as many xerographic or ink jet systems. Binary printing systems generally use a halftoning process to simulate continuous tone images. Conventional halftone screens employed by binary printers have a frequency approximately equal to 130-150 cpi dots. However, when rendering gray edge pixels, such as anti-aliased edge pixels common in text/line art, a very high frequency cell, ideally one having a frequency similar to the pixel resolution of the final output image, should be employed. Using a standard system halftone dot at the standard halftone frequency (e.g., approximately 130-150 cpi dots) to render anti-aliased pixels results in jagged edges often with objectionable halftone dots positioned along the edges of lines and characters. On the other hand, the use of a very high frequency screen over the entire image renders the anti-aliased pixel properly but introduces objectionable image artifacts in pictorial image areas and tends to sharpen the tonal curve and provoke print quality defects in the overall image.

A common goal in the development of printers and printing systems is improving image quality. High addressability imaging techniques have proven very successful in improving the image quality of printing systems. However, the divergent processing needs required by different images types are particularly evident in printing systems generating high addressability pixels. The use of high addressability rendering for both anti-aliased text/line art and pictorial contones has led to the development of printing systems having multiple rendering processors. Specifically, because available decomposers generally cannot perform high quality, high addressability rendering of text/line art, it is desirable to include dedicated hardware to perform high addressability rendering on anti-aliased text/line art in addition to a processor to render high addressability halftones. While such systems produce high quality output images, the need for multiple processors for different image types greatly increases the complexity and cost of the hardware and software modules required by the systems.

As with printing systems, improving image quality is a continuing concern when developing scanning devices and reproducing images from scanned data. To address the divergent processing needs of different images types when reproducing images from scanned data, scanning devices generally rely on automatic image segmentation techniques to identify different image types within image data and classify pixels accordingly. Based on the classification, the image data may then be processed according to the properties of that class of imagery. However, simply accurately identifying the image type does not guarantee image quality.

To accurately reproduce scanned halftone images, it is desirable to reproduce the screen of the printed halftone image. If the frequency of the scanned halftone is sufficiently low, for example, below 130 cpi, many existing reproduction systems attempt to reproduce an image with its given halftone screen (i.e., no de-screening) by employing simple thresholding, error diffusion or similar processing. While this halftone replication method works well for some low frequency screens, with middle frequency and higher frequency screens, it tends to introduce unwanted artifacts that degrade image quality. Thus, higher frequency halftones are typically low pass filtered (de-screened) and then re-screened with a halftone that is suitable for the intended printer. While the above process accurately reproduces scanned images, it has some drawbacks. The de-screening process typically introduces blur into the image. Furthermore, although passing scanned halftones using error diffusion can be used to accurately reproduce low frequency halftone screens without introducing serious artifacts, it does not ensure the rendered image has compact halftone dots resulting in images which are prone to noise and instability.

Scanned halftones often print with poor color rendition because print engine compensation is not built into the halftone dots because some print engines have a relatively high non-linear tone response with non-linearity being fairly dependent on the halftone frequency. For orthographic input, the print engine tone response can be well characterized and compensation can be built into the halftone thresholds thereby building compensation into the resulting dots. In a reprographic image path, low frequency scanned halftones are passed through the system to be printed using the halftone that occurred on the input image. That halftone may possess dots that were compensated for the original print engine, but will not possess dots that are compensated for the target print engine in the reprographic image path and will print with density errors and color shifts. This problem generally occurs in any printer with a nonlinear, non-ideal response, but high gamma print engines are particularly prone to this defect.

What is needed in the art is a method for compensating for the problem that scanned halftone images will not print properly in imaging systems that pass the input halftone through unfiltered due to the dependence of the overall system TRC on the interactions between a specific halftone and the engine characteristics.

SUMMARY OF THE INVENTION

What is disclosed is an image path that advantageously uses halftone classification to select appropriate mappings in gray-scale management and color management operations. The tags generated in the scanner help identify different classes of halftones. One is selected from several pixel-value mappings to provide proper compensation. That is, the one-dimensional and multi-dimensional pixel-value mappings within the color management module are selected based on halftone classification tags from the scanner. The tagging is either one bit that indicates "Low Frequency Halftone" and "Not LFHT", or, more preferably, the tag is multi-bit indicating a frequency bin that contains the frequency of the input halftone. Additionally, the multi-bit tag can indicate particular halftone screen types, such as dot screen, line screens, stochastic screens or error diffusion. The pixel value mappings are typically implemented as Look-Up Tables (LUTs), and the LUTs of the present invention are optimized for the various halftone classes. Generation of the LUTs, or other pixel-value mappings, is non-trivial in that such mappings are normally applied to contone images and not to blurred halftoned images. The pixel-value mappings of the present invention are derived via an iterative process. Alternatively, a model for this modulated image type is used.

DETAILED DESCRIPTION OF THE SPECIFICATION

What is disclosed is an image path that advantageously uses halftone classification to select appropriate mappings in gray-scale management and color management operations. The tags generated in the [processing] help identify different classes of halftones. One is selected from several pixel-value mappings to provide proper compensation. That is, the one-dimensional and multi-dimensional pixel-value mappings within the Color Management Module (CMM) are selected based on halftone classification tags from the scanner. The tagging is either one bit that indicates "Low Frequency Halftone" and "Not LFHT", or, more preferably, the tag is multi-bit indicating a frequency bin that contains the frequency of the input halftone. Additionally, the multi-bit tag can indicate particular halftone screen types, such as dot screens, line screens, stochastic screens or error diffusion, and it may indicate the angle of a screen. The pixel value mappings are typically implemented as Look-Up Tables (LUTs), and the LUTs of the present invention are optimized for the various halftone classes. Generation of the LUTs, or other pixel-value mappings, is non-trivial in that such mappings are normally applied to contone images and not to blurred halftoned images. The pixel-value mappings of the present invention are derived via an iterative process. Alternatively, a model for this modulated image type is used.

In accordance with the present invention, within a scanning system, spatial and/or signal processing analysis is performed on an input image to determine regions that contain input halftones. Within the print controller, the module that often performs these operations is the image processing module which is usually a part of a print controller and may also perform pixel-value mapping, such as one-dimensional mappings (Tone Reproduction Curves—TRCs) and multi-dimensional mappings, where these mappings are typically implemented using Look-Up Tables (LUTs) and/or specialized mathematical operations (e.g., matrices, sigmoid functions, etc.). The pixel-value mapping is preferably selected based on halftone structures, e.g., dot screen, line screen, error diffusion, or stochastic screen.

It should be understood that although the discussion herein uses LUTs for implementing a "pixel-value mapping", other methods could be used such as, for instance, one or more parameterized functions (e.g., parameterized sigmoid function). Other methods for implementing a pixel-value mapping are anticipated and therefor are to be considered within the scope of the present invention, as the method herein addresses different dimensionalities such as, one-dimensional pixel-value mappings (i.e., mappings for single separations of which a black and white image is an example). A one-dimensional pixel-value mapping is often referred to as a Tone Reproduction Curve (TRC) and is usually implemented as a LUT. Multi-dimensional mappings addressed herein are, for example, a three-dimensional-to-three-dimensional LUT that maps from RGB (Red, Green, Blue) values to CMY (Cyan, Magenta, Yellow) values.

The LUTs and TRCs are set up to obtain a number of mappings between the desired observed colors and the output rendering of the C, M, Y, and K separations. [I don't think these two sentences that I deleted make sense. You could write "The values in the LUT and TRC are optimized to produce on a print the desired observed colors for a given halftone classification (frequency, structure, angle, . . . ). The halftone dependence comes from the limited resolution of scanner and printer.

The frequencies of the halftones are identified and the regions are classified as being within a certain frequency range (e.g., 80-100 dpi). The ranges can be relatively large (e.g., a low-frequency halftone between 65 dpi and 150 dpi) or rather small (e.g., between 80 dpi and 100 dpi).

Each halftone class within the image is given at least one tag denoting frequency range. Additionally, a tag may denote a particular halftone structure such as a dot screen, line screen, stochastic screen or error diffusion halftone. Also, it may indicate the angle of a screen.

Thereafter, the CMM uses the halftone frequency class information to apply the appropriate color conversion. A static version of a print controller's color management module would select pre-defined multidimensional LUTs (e.g., Lab-to-CMYK) and TRCs based on the screen classifier denoted by one or more tags denoting frequency range and type. A dynamic version of a print controller's color management module would calculate color conversions (e.g., matrices, LUTs, etc.) and calibration curves (e.g., sigmoid function, spline fit, etc.) based on the halftone frequency and type classifiers. Each color conversion implementation is preferably optimized for specific frequencies and types of input halftones.

It should also be understood that LUTs are not central to the present invention as techniques for this purpose vary widely in this art. Thus, the present invention is directed toward their use and not table design as techniques vary. For instance, one table design uses an iterative process based on a 16-region conceptual model of the colors input to the table wherein the space of scanned colors is divided into 16 regions associated with the 16 possible overprints of C, M, Y, and K. Colors in the green region, for example, are printed with 100% cyan and yellow. The size of a green overprinted area (intersection of C and Y dots) being controlled by the location of the surface that separates the green region of color space from the other regions.

Using an initial estimate of the color space boundaries, color patches are printed. Using these results, a better estimate of the boundary positions is obtained. This process is iteratively until a suitable match has been obtained between the colors of the scanned image and the reproduction.

What is claimed is:

1. A method for obtaining a preferred color conversion implementation for rendering of an image containing halftoned data, comprising:
   providing a plurality of pixel-value to color rendering value mappings, each pixel-value to color rendering value mapping corresponding to a distinct color conversion implementation for converting a pixel-value of the image to a pixel-value in a colorspace used for rendering the image, each color conversion implementation corresponding to a distinct halftone type;
   processing, using a processor, the image and generating therefrom a plurality of tags denoting the frequencies of halftoned data of the image containing halftoned data;
   identifying different classes of halftones from the tags to obtain a plurality of halftone classifications;
   selecting one of the halftone classifications;
   selecting one of the plurality of pixel-value to color rendering value mappings, based upon the selected halftone classification, to obtain the preferred color conversion implementation for rendering the image containing halftoned data; and
   rendering, using a printer, the image containing halftoned data using the selected pixel-value to color rendering value mapping.

2. The method for obtaining a preferred color conversion implementation, as in claim 1, further comprising performing spatial analysis and/or signal processing on the image to determine regions containing input halftones.

3. The method for obtaining a preferred color conversion implementation, as in claim 1, wherein the pixel-value to color rendering value mappings are look-up tables, each look-up table corresponding to a distinct color conversion implementation.

4. The method for obtaining a preferred color conversion implementation, as in claim 1, further comprising generating a set of calibration curves from said halftone classifications.

5. The method for obtaining a preferred color conversion implementation, as in claim 1, wherein the pixel-value to color rendering value mappings are tone reproduction curves, each tone reproduction curve corresponding to a distinct color conversion implementation.

6. The method for obtaining a preferred color conversion implementation, as in claim 1, wherein the pixel-value to color rendering value mappings are multi-dimensional.

7. The method for obtaining a preferred color conversion implementation, as in claim 1, wherein the pixel-value to color rendering value mappings are specialized mathematical functions, each specialized mathematical function corresponding to a distinct color conversion implementation.

8. The method for obtaining a preferred color conversion implementation, as in claim 1, further comprising obtaining at least one mapping between colors observed and an output rendering of CMYK separations.

9. The method, as in claim 1, wherein the pixel-value to color rendering value mappings are matrices, each matrix corresponding to a distinct color conversion implementation.

10. The method, as in claim 1, wherein the pixel-value to color rendering value mappings are sigmoid functions, each sigmoid function corresponding to a distinct color conversion implementation.

11. The method, as in claim 1, further comprising using look-up tables and/or tone reproduction curves to determine a location of at least one boundary region in colorspace.

12. The method, as in claim 11, wherein an optimum boundary region in colorspace is a function of halftone frequency response.

13. The method, as in claim 11, wherein an initial estimate of any one colorspace boundary is preferred until a better estimate of that boundary location is known.

14. A system for obtaining a preferred color conversion implementation for rendering of an image containing halftoned data, comprising:
   a memory including a plurality of pixel-value to color rendering value mappings, each pixel-value to color rendering value mapping corresponding to a distinct color conversion implementation for converting a pixel-value of the image to a pixel-value in a colorspace used for rendering the image, each color conversion implementation corresponding to a distinct halftone type; and
   a processing unit;
   said processing unit generating a plurality of tags denoting the frequencies of halftoned data of the image containing halftoned data;
   said processing unit identifying different classes of halftones from said tags to obtain a plurality of halftone classifications;
   said processing unit selecting one of the halftone classifications; and
   said processing unit one of the plurality of pixel-value to color rendering value mappings, based upon the selected halftone classification, to obtain the preferred color conversion implementation for rendering the image containing halftoned data.

15. The system, as in claim 14, performing spatial analysis and/or signal processing on the image to determine regions containing input halftones.

16. The system, as in claim 14, wherein the pixel-value to color rendering value mappings are look-up tables, each look-up table corresponding to a distinct color conversion implementation.

17. The system, as in claim 14, generating a set of calibration curves from said halftone classifications.

18. The system, as in claim 14, obtaining at least one mapping between colors observed and an output rendering of CMYK separations.

19. The system, as in claim 16, wherein the pixel-value to color rendering value mappings are tone reproduction curves, each tone reproduction curve corresponding to a distinct color conversion implementation.

20. The system, as in claim 16, wherein the pixel-value to color rendering value mappings are specialized mathematical functions, each specialized mathematical function corresponding to a distinct color conversion implementation.

21. The system, as in claim 14, wherein the pixel-value to color rendering value mappings are matrices, each matrix corresponding to a distinct color conversion implementation.

22. The system, as in claim 14, wherein the pixel-value to color rendering value mappings are sigmoid functions, each sigmoid function corresponding to a distinct color conversion implementation.

23. The system, as in claim 14, further comprising using look-up tables and/or tone reproduction curves to determine a location of at least one boundary region in colorspace.

24. The system, as in claim 23, wherein an optimum boundary region in colorspace is a function of halftone frequency response.

25. The system, as in claim 23, wherein an initial estimate of any one colorspace boundary is preferred until a better estimate of that boundary location is known.

26. A method for obtaining a preferred color conversion implementation for rendering of an image containing halftoned data, comprising:
    providing a plurality of pixel-value to color rendering value mappings, each pixel-value to color rendering value mapping corresponding to a distinct color conversion implementation for converting a pixel-value of the image to a pixel-value in a colorspace used for rendering the image, each color conversion implementation corresponding to a distinct halftone type;
    processing, using a processor, the image and generating therefrom a plurality of tags denoting the frequencies of halftoned data of the image containing halftoned data;
    identifying different classes of halftones from the tags to obtain a plurality of screen classifications;
    selecting one of the screen classifications;
    selecting one of the plurality of pixel-value to color rendering value mappings, based upon the selected screen classification, to obtain the preferred color conversion implementation for rendering the image containing halftoned data; and
    rendering, using a printer, the image containing halftoned data using the selected pixel-value to color rendering value mapping.

27. The method for obtaining a preferred color conversion implementation, as in claim 26, wherein the pixel-value to color rendering value mappings are look-up tables, each look-up table corresponding to a distinct color conversion implementation.

28. The method for obtaining a preferred color conversion implementation, as in claim 26, wherein the pixel-value to color rendering value mappings are tone reproduction curves, each tone reproduction curve corresponding to a distinct color conversion implementation.

29. The method for obtaining a preferred color conversion implementation, as in claim 26, wherein the pixel-value to color rendering value mappings are multi-dimensional.

30. The method for obtaining a preferred color conversion implementation, as in claim 26, wherein the pixel-value to color rendering value mappings are specialized mathematical functions, each specialized mathematical function corresponding to a distinct color conversion implementation.

31. The method, as in claim 26, wherein the pixel-value to color rendering value mappings are matrices, each matrix corresponding to a color.

32. The method, as in claim 26, wherein the pixel-value to color rendering value mappings are sigmoid functions, each sigmoid function corresponding to a distinct color conversion implementation.

33. A system for obtaining a preferred color conversion implementation for rendering of an image containing halftoned data, comprising:
    a memory including a plurality of pixel-value to color rendering value mappings, each pixel-value to color rendering value mapping corresponding to a distinct color conversion implementation for converting a pixel-value of the image to a pixel-value in a colorspace used for rendering the image, each color conversion implementation corresponding to a distinct halftone type; and
    a processing unit;
    said processing unit generating a plurality of tags denoting the frequencies of halftoned data of the image containing halftoned data;
    said processing unit identifying different classes of halftones from said tags to obtain a plurality of screen classifications;
    said processing unit selecting one of the screen classifications; and
    said processing unit selecting, from said memory, one of the plurality of pixel-value to color rendering value mappings, based upon the selected screen classification, to obtain the preferred color conversion implementation for rendering the image containing halftoned data.

34. The system for obtaining a preferred color conversion implementation, as in claim 33, wherein the pixel-value to color rendering value mappings are look-up tables, each look-up table corresponding to a distinct color conversion implementation.

35. The system for obtaining a preferred color conversion implementation, as in claim 33, wherein the pixel-value to color rendering value mappings are tone reproduction curves, each tone reproduction curve corresponding to a distinct color conversion implementation.

36. The system for obtaining a preferred color conversion implementation, as in claim 33, wherein the pixel-value to color rendering value mappings are multi-dimensional.

37. The system for obtaining a preferred color conversion implementation, as in claim 33, wherein the pixel-value to color rendering value mappings are specialized mathematical functions, each specialized mathematical function corresponding to a distinct color conversion implementation.

38. The system, as in claim 33, wherein the pixel-value to color rendering value mappings are matrices, each matrix corresponding to a distinct color conversion implementation.

39. The system, as in claim 33, wherein the pixel-value to color rendering value mappings are sigmoid functions, each sigmoid function corresponding to a distinct color conversion implementation.

* * * * *